(12) United States Patent
Wu

(10) Patent No.: US 11,502,832 B2
(45) Date of Patent: Nov. 15, 2022

(54) ELECTRONIC DEVICE CAPABLE OF PROTECTING CONFIDENTIAL DATA

(71) Applicant: PUFsecurity Corporation, Hsinchu County (TW)

(72) Inventor: Chia-Cho Wu, Hsinchu County (TW)

(73) Assignee: PUFsecurity Corporation, Hsinchu County (TW)

( * ) Notice: Subject to any disclaimer, the term of this patent is extended or adjusted under 35 U.S.C. 154(b) by 97 days.

(21) Appl. No.: 17/105,476

(22) Filed: Nov. 25, 2020

(65) Prior Publication Data

US 2021/0385072 A1 Dec. 9, 2021

Related U.S. Application Data

(60) Provisional application No. 63/034,410, filed on Jun. 4, 2020.

(51) Int. Cl.
*H04L 9/08* (2006.01)
*G06F 3/06* (2006.01)
(Continued)

(52) U.S. Cl.
CPC ............ *H04L 9/088* (2013.01); *G06F 3/0623* (2013.01); *G06F 3/0655* (2013.01);
(Continued)

(58) Field of Classification Search
CPC ..... H04L 9/088; H04L 9/0838; H04L 9/0631; H04L 9/0637; H04L 9/0866;
(Continued)

(56) References Cited

U.S. PATENT DOCUMENTS

| 4,847,902 A | 7/1989 | Hampson |
| 6,259,378 B1 | 7/2001 | Block |
| (Continued) | | |

FOREIGN PATENT DOCUMENTS

| CN | 103679004 A | 3/2014 |
| EP | 3 460 705 A1 | 3/2019 |
| (Continued) | | |

OTHER PUBLICATIONS

A Proposed System Concept on Enhancing the Encryption and Decryption Method for Cloud Computing, by Pitchay (Year: 2015).*
(Continued)

*Primary Examiner* — Vu V Tran
(74) *Attorney, Agent, or Firm* — Winston Hsu

(57) ABSTRACT

An electronic device includes a first non-volatile memory and an application circuit. The first non-volatile memory stores first encrypted data encrypted with a global key. The application circuit includes a second non-volatile memory, a decryption unit, a local key unit, and an encryption unit. The second non-volatile memory stores the global key. The decryption unit is coupled to the first non-volatile memory and the second non-volatile memory. The decryption unit retrieves the global key from the second non-volatile memory and decrypts the first encrypted data with the global key to generate plain data. The local key unit generates or stores a local key. The encryption unit is coupled to the local key unit. The encryption unit encrypts the plain data with the local key to generate second encrypted data and overwrites the first encrypted data in the first non-volatile memory with the second encrypted data.

8 Claims, 3 Drawing Sheets

(51) Int. Cl.
*G11B 20/00* (2006.01)
*G06F 21/78* (2013.01)
*H04L 9/06* (2006.01)
*G06F 21/57* (2013.01)
*G06F 21/79* (2013.01)
*G06F 21/60* (2013.01)
*G11C 16/08* (2006.01)
*G11C 16/26* (2006.01)

(52) U.S. Cl.
CPC ...... *G06F 3/0679* (2013.01); *G11B 20/00246* (2013.01); *G11B 20/00478* (2013.01); *H04L 9/0838* (2013.01)

(58) Field of Classification Search
CPC ... H04L 9/0894; G06F 3/0623; G06F 3/0655; G06F 3/0679; G06F 21/78; G06F 21/572; G06F 21/79; G06F 21/602; G11B 20/00246; G11B 20/00478; G11C 16/08; G11C 16/26
See application file for complete search history.

(56) References Cited

U.S. PATENT DOCUMENTS

| | | |
|---|---|---|
| 7,127,610 B1 * | 10/2006 | Li .......................... H04L 63/065 709/201 |
| 7,353,404 B2 | 4/2008 | Hashimoto |
| 7,783,897 B2 | 8/2010 | McLean |
| 9,792,439 B2 | 10/2017 | Colnot |
| 10,181,054 B1 * | 1/2019 | Lyadvinsky ........ G06F 21/6209 |
| 10,771,448 B2 | 9/2020 | Kocher |
| 2008/0092210 A1 * | 4/2008 | Tobita .............. G11B 20/00731 726/2 |
| 2012/0079270 A1 * | 3/2012 | Patel .................. H04N 21/2351 713/165 |
| 2019/0065787 A1 * | 2/2019 | Bildhaiya ............. G06F 21/554 |
| 2019/0163912 A1 * | 5/2019 | Kumar .................. H04L 9/3297 |
| 2020/0242274 A1 * | 7/2020 | Pan ....................... H04L 9/3228 |
| 2021/0243042 A1 * | 8/2021 | Ahn ................... H04L 9/3278 |
| 2021/0365566 A1 * | 11/2021 | Souissi ................ H04L 9/3249 |

FOREIGN PATENT DOCUMENTS

| | | |
|---|---|---|
| JP | 2001-517582 A | 10/2001 |
| JP | 2006-295916 A | 10/2006 |
| JP | 2008-102618 A | 5/2008 |
| JP | 2015-531924 A | 11/2015 |
| TW | I525631 B | 3/2016 |
| TW | 201702868 A | 1/2017 |
| TW | 202011248 A | 3/2020 |

OTHER PUBLICATIONS

André Schaller et al.. Lightweight Anti-Counterfeiting Solution for Low-End Commodity Hardware Using Inherent PUFs, Springer International, Switzerland, pp. 1-18, XP055803964, 2014.

* cited by examiner

ELECTRONIC DEVICE CAPABLE OF PROTECTING CONFIDENTIAL DATA

CROSS REFERENCE TO RELATED APPLICATIONS

This non-provisional application claims priority of U.S. provisional application No. 63/034,410, filed on Jun. 4, 2020, included herein by reference in its entirety.

BACKGROUND OF THE INVENTION

1. Field of the Invention

The present invention is related to an electronic device, and more particular to an electronic device capable of protecting confidential data by global encryption and local encryption.

2. Description of the Prior Art

Firmware is a low-level computer software and is usually used to control the electronic device for initial setup. Since the firmware may be retrieved every time when the electronic device is powered on, the firmware should be preserved when powered off. Also, the firmware is crucial for enabling the electronic device. Usually, without the correct firmware, the electronic device cannot be setup to the right condition and cannot function normally. Therefore, the firmware is usually stored in a flash memory.

However, due to the crucial role taken by the firmware, hackers have been trying to access the firmware. For example, hackers may try to copy the firmware in the factory when downloading the firmware to the flash memory, or copy the firmware from one authorized electronic device to another unauthorized electronic device. Therefore, encryption techniques are required to protect the firmware from being hacked.

SUMMARY OF THE INVENTION

One embodiment of the present invention discloses an electronic device. The electronic device includes a first non-volatile memory and an application circuit. The first non-volatile memory stores first encrypted data encrypted with a global key. The application circuit includes a second non-volatile memory, a decryption unit, a local key unit, and an encryption unit. The second non-volatile memory stores the global key. The decryption unit is coupled to the first non-volatile memory and the second non-volatile memory. The decryption unit retrieves the global key from the second non-volatile memory and decrypts the first encrypted data with the global key to generate plain data. The local key unit generates or stores a local key. The encryption unit is coupled to the local key unit. The encryption unit encrypts the plain data with the local key to generate second encrypted data and overwrites the first encrypted data in the first non-volatile memory with the second encrypted data.

Another embodiment of the present invention discloses a method for operating an electronic device. The electronic device includes a first non-volatile memory and an application circuit. The application circuit includes a second non-volatile memory, a first decryption unit, and an encryption unit.

The method for operating the electronic device includes the first non-volatile memory storing first encrypted data encrypted with a global key, the second non-volatile memory storing the global key, the first decryption unit retrieving the global key from the second non-volatile memory, the first decryption unit decrypting the first encrypted data with the global key to generate plain data, the encryption unit encrypting the plain data with a local key to generate second encrypted data, and the encryption unit overwriting the first encrypted data in the first non-volatile memory with the second encrypted data.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
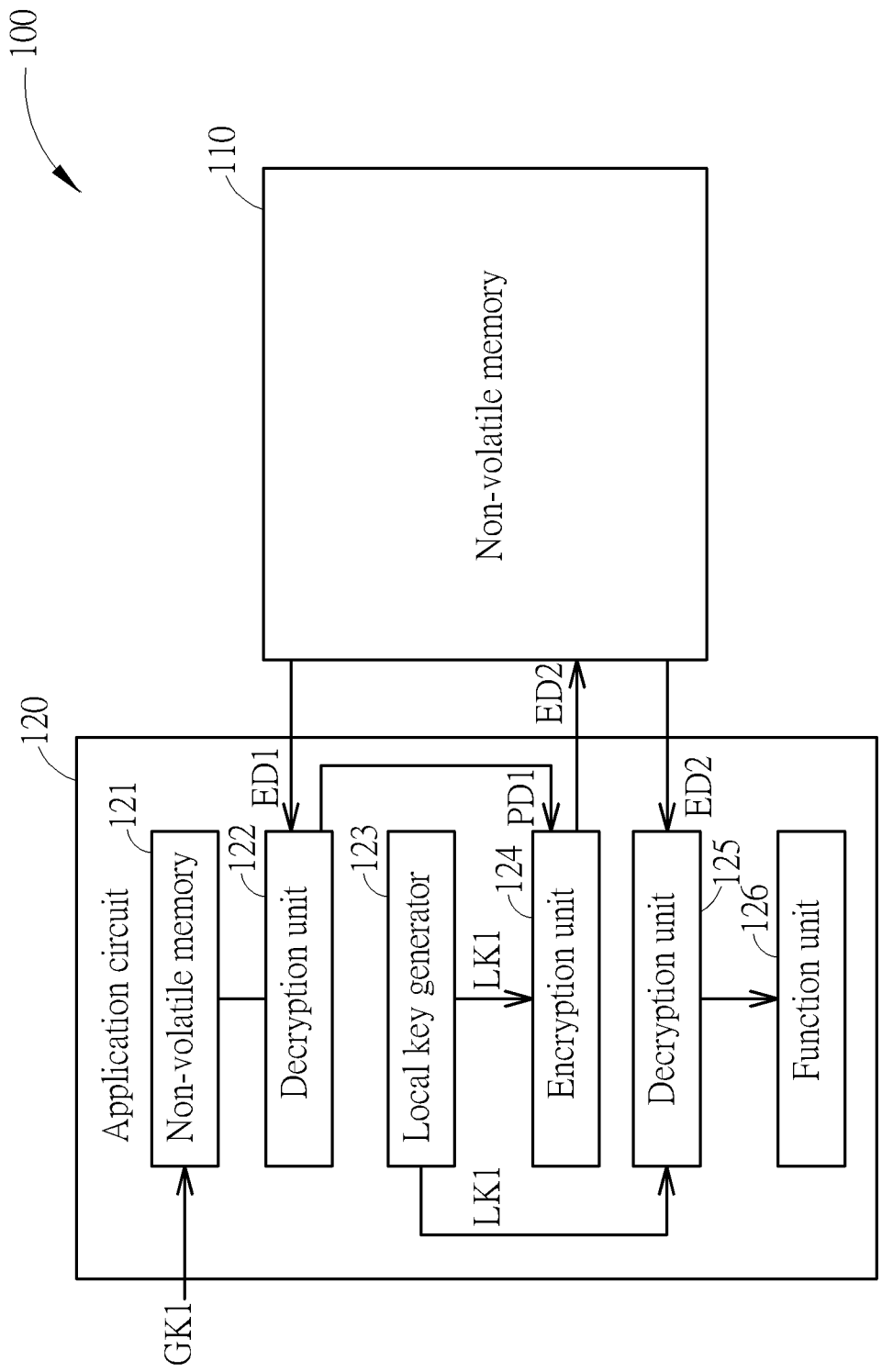
FIG. 1 shows an electronic device according to one embodiment of the present invention.

FIG. 1 shows an electronic device 100 according to one embodiment of the present invention. The electronic device 100 includes a non-volatile memory 110 and an application circuit 120. In some embodiments, the application circuit 120 can be an application specific integrated circuit (ASIC), and the non-volatile memory 110 can store the firmware required by the application circuit 120. For example, the non-volatile memory 110 can include a flash memory and/or a secure digital memory card (SD card).

In some embodiments, the non-volatile memory 110 and the application circuit 120 can be designed and manufactured by different companies. In this case, to protect the firmware from being hacked, the firmware can be encrypted with a global key GK1 as encrypted data ED1, and the encrypted data ED1 can be provided to the factory. Therefore, the factory that is responsible to store the encrypted data ED1 to the non-volatile memory 110 will only receive the encrypted data ED1 instead of the plain data PD1 of the firmware, thereby improving the information safety of the firmware downloading process.

In this case, to decrypt the encrypted data ED1, the global key GK1 will be stored to the application circuit 120. The application circuit 120 includes a non-volatile memory 121, a decryption unit 122, a local key unit 123, and an encryption unit 124. The decryption unit 122 can be coupled to the non-volatile memory 110 and the non-volatile memory 121. The non-volatile memory 121 can store the global key GK1 used to encrypt the firmware for generating the encrypted data ED1. Therefore, the decryption unit 122 can retrieve the global key GK1 from the non-volatile memory 121 and decrypt the encrypted data ED1 with the global key GK1 to obtain the plain data PD1 of the firmware. In some embodiments, the non-volatile memory 121 can include a one-time programmable (OTP) non-volatile memory, so that the global key GK1 can be stored in a safe environment and cannot be altered.

In FIG. 1, the encryption unit 124 can be coupled to the local key unit 123. The local key unit 123 can generate or store a local key LK1, and the encryption unit 124 can encrypt the plain data PD1 with the local key LK1 to generate second encrypted data ED2 after the plain data PD1 of the firmware is obtained. Afterwards, the encryption unit 124 can overwrite the first encrypted data ED1 in the non-volatile memory 110 with the second encrypted data ED2. In some embodiments, the encryption unit 124 can encrypt the plain data PD1 to generate the encrypted data ED2 according to an authenticated encryption with associated data (AEAD) algorithm. For example, the Galois/Counter Mode (GCM) provided by the Advanced Encryption Standard (AES) may be used by the encryption unit 124. In some embodiments, since the GCM encryption method has included the GHASH and the Galois Message Authentication Code (GMAC) techniques, it can help to protect the firmware from being modified. Therefore, the encryption unit 124 may adopt the GCM encryption method to encrypt the plain data PD1 with the local key LK1 to provide a thorough protection. In some embodiments, the encrypted data ED1 and the encrypted data ED2 can be generated with the same encryption algorithm; however, in some other embodiments, the encrypted data ED1 and the encrypted data ED2 can be generated with different encryption algorithms.

Furthermore, since the local key LK1 is stored or generated locally by the local key unit 123, the encrypted data ED2 encrypted by the local key LK1 cannot be decrypted by other electronic devices using other local keys. That is, even if the hacker dumps the encrypted data ED2 from the non-volatile memory 110 of the electronic device 100, the encrypted data ED2 cannot be used by any other electronic devices without the local key LK1. Therefore, the illegitimate spreading of the firmware on unauthorized devices can be reduced.

In some embodiments, the local key unit 123 can include physically unclonable function (PUF) cells. Each of the physically unclonable function cells can generate a random bit according to its intrinsic and uncontrollable physical characteristics generated during the manufacturing process; therefore, the local key LK1 generated by the local key unit 123 can be unique and unpredictable, thereby enhancing the encryption made by the encryption unit 124. However, in some other embodiments, the local key LK1 can be provided by other systems in advance and can be stored to the local key unit 123 later.

Figure 2:
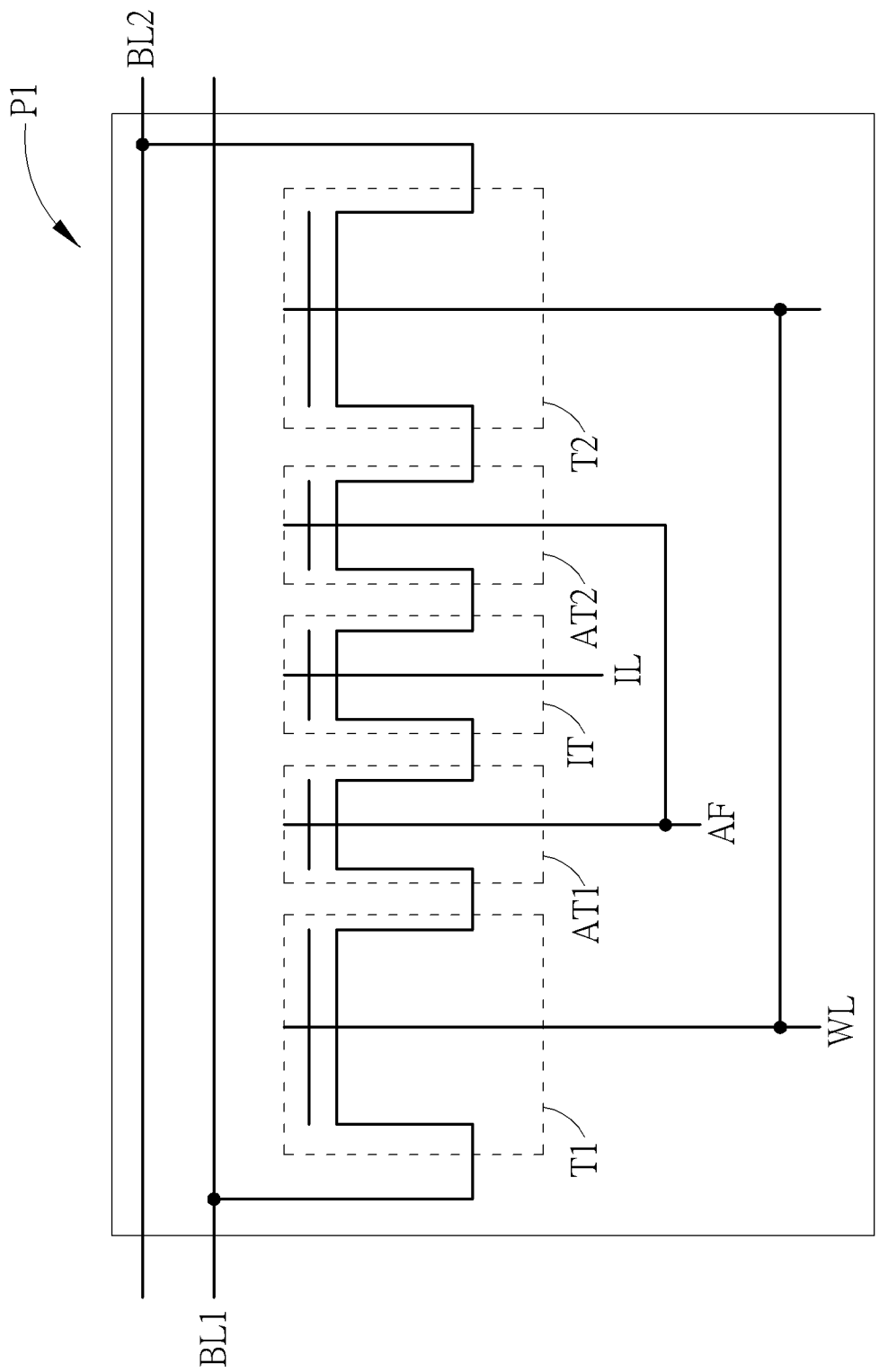
FIG. 2 shows a PUF cell of the local key unit in FIG. 1 according to one embodiment of the present invention.

FIG. 2 shows a PUF cell P1 of the local key unit 123 according to one embodiment of the present invention. The PUF cell P1 includes a first select transistor T1, a second select transistor T2, an isolation transistor IT, a first anti-fuse transistor AT1, and a second anti-fuse transistor AT2. The first select transistor T1 has a first terminal coupled to a first bit line BL1, a second terminal, and a control terminal coupled to a word line WL. The first anti-fuse transistor AT1 has a first terminal coupled to the second terminal of the first select transistor T1, a second terminal, and a control terminal coupled to an anti-fuse control line AF. The second anti-fuse transistor AT2 has a first terminal, a second terminal, and a control terminal coupled to the anti-fuse control line AF. The second select transistor T2 has a first terminal coupled to a second bit line BL2, a second terminal coupled to the first terminal of the second anti-fuse transistor AT2, and a control terminal coupled to the word line WL. The isolation transistor IT has a first terminal coupled to the second terminal of the first anti-fuse transistor AT1, a second terminal coupled to the second terminal of the second anti-fuse transistor AT2, and a control terminal coupled to an isolation control line IL.

During an enroll operation of the PUF cell P1, the bit lines BL1 and BL2 are at a low voltage, the word line WL is at a high voltage, the isolation control line IL is at the high voltage, and the anti-fuse control line AF is at a program voltage higher than the high voltage. In this case, the isolation transistor IT, and the select transistors T1 and T2 are turned on, so both the low voltage and the program voltage are imposed on the anti-fuse transistors AT1 and AT2. The voltage difference applied on the anti-fuse transistors AT1 and AT2 is high enough to rupture the anti-fuse transistors AT1 and AT2. However, due to the physical characteristic variations caused in the manufacturing process of the anti-fuse transistors AT1 and AT2, one of the anti-fuse transistors AT1 and AT2 is ruptured first, and the first ruptured anti-fuse transistor will relieve the voltage stress, preventing the other anti-fuse transistor from being ruptured. That is, after the enroll operation, the anti-fuse transistors AT1 and AT2 will be at different conditions: one is ruptured, and one is not.

Once the PUF cell P1 is enrolled, the bit data can be read from the bit lines BL1 and BL2 by the read operation. During the read operation, the word line WL is at the high voltage, the isolation control line IL is at the low voltage, and the anti-fuse control line AF is at a read voltage, which can be substantially equal to the high voltage on the word line WL. In this case, the isolation transistor IT is turned off, the select transistors T1 and T2 are turned on, and the anti-fuse transistors AT1 and AT2 will generate currents according to their conditions. That is, the intensity of the currents generated by the anti-fuse transistors AT1 and AT2 is related to whether they are ruptured or not. Therefore, a sensing amplifier may be used to sense the difference between currents on the bit lines BL1 and BL2, and the enrolled bit data in the PUF cell P1 can be read.

The PUF cell P1 shown in FIG. 2 is provided as an example; however, in some other embodiments, the local key unit 123 may include other types of PUF cells to generate the local key LK1.

In FIG. 1, the application circuit 120 can further include a decryption unit 125 and a functional unit 126. The decryption unit 125 can be coupled to the non-volatile memory 110 and the local key unit 123. The decryption unit 125 can retrieve the local key LK1 from the local key unit 123, and can decrypt the encrypted data ED2 with the local key LK1 to generate the plain data PD1. Consequently, the functional unit 126 can perform operations according to the plain data PD1. The functional unit 126 can be, for example, but not limited to, a processor or a controller, and the plain data PD1 can be the firmware used for setting the functional unit 126 and/or the electronic device 100.

In some embodiments, the application circuit 120 and the non-volatile memory 110 can be disposed in two different chips, and can be manufactured or designed by different companies. Furthermore, in some embodiments, the global key GK1 can be preinstalled to the non-volatile memory 121 before or during a packaging process of the application circuit 120, and the encrypted data ED1 can be preinstalled to the non-volatile memory 110 before the chip assembly process of the electronic device 100. Therefore, the plain data PD1 can be protected from being leaked by the factory when storing the plain data PD1 to the non-volatile memory 110. Also, before the electronic device 100 is shipped to the users, the decryption unit 122 can decrypt the encrypted data ED1 with the global key GK1 to generate the plain data PD1, and the encryption unit 124 can re-encrypt the plain data PD1 with the local key LK1. Therefore, the plain data PD1 can be protected from being used by other electronic devices without authorization.

In the present embodiment, the plain data PD1 can be the firmware required by the application circuit 120; however, in some other embodiments, the plain data PD1 can be other types of crucial information needed by the application circuit 120.

Figure 3:
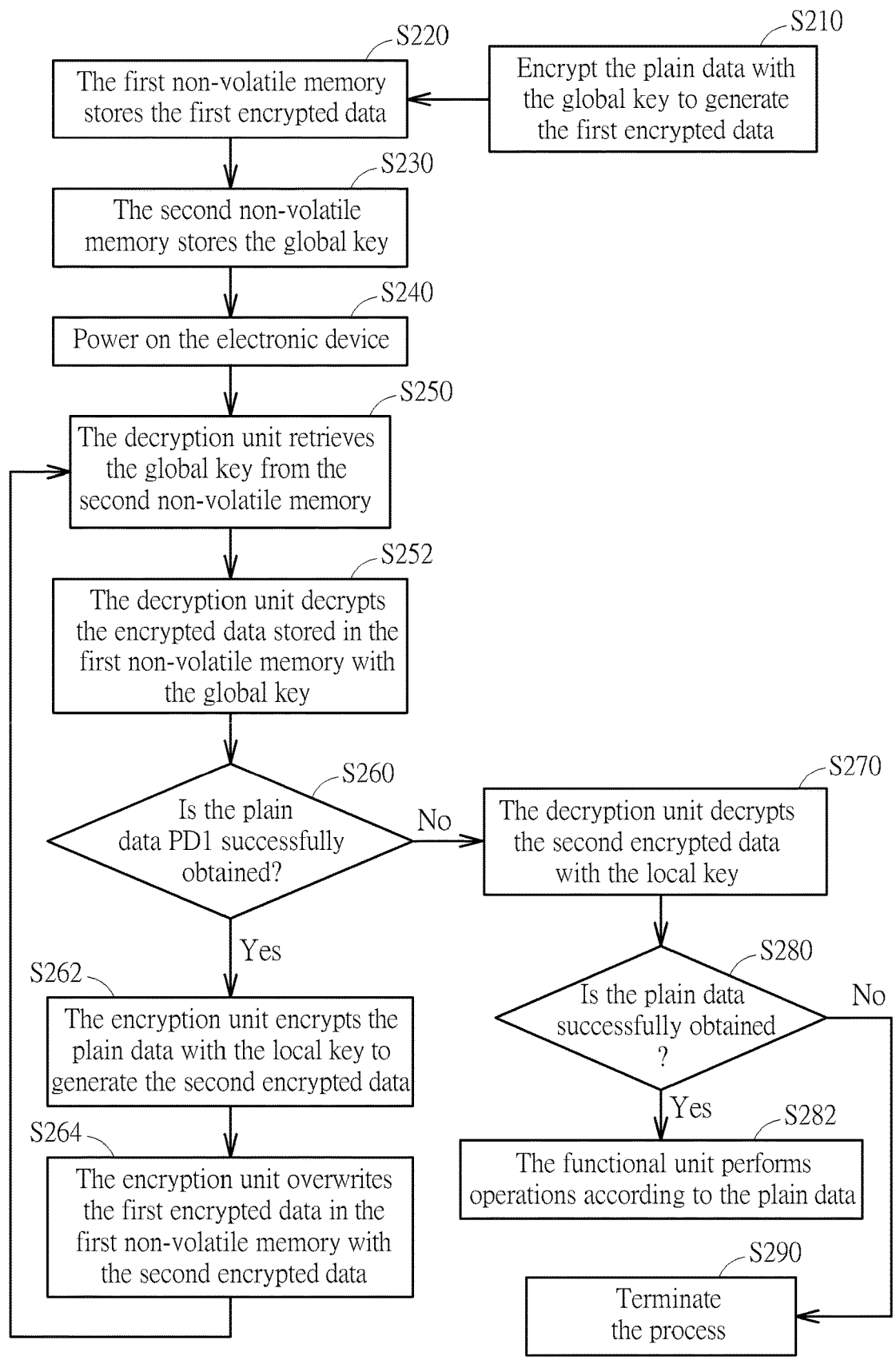
FIG. 3 shows a flowchart of a method for operating the electronic device in FIG. 1.

FIG. 3 shows a flowchart of a method 200 for operating the electronic device 100. The method 200 includes steps S210 to S210 to S290.

S210: encrypt the plain data PD1 with the global key GK1 to generate the encrypted data ED1;

S220: the non-volatile memory 110 stores the encrypted data ED1 encrypted with the global key GK1;

S230: the non-volatile memory 121 stores the global key GK1;

S240: power on the electronic device 100;

S250: the decryption unit 122 retrieves the global key GK1 from the non-volatile memory 121;

S252: the decryption unit 122 decrypts the encrypted data ED1 with the global key GK1;

S260: if the plain data PD1 is successfully obtained after the decryption using the global key GK1, then go to step S262, else go to step S270;

S262: the encryption unit 124 encrypts the plain data PD1 with the local key LK1 to generate the encrypted data ED2;

S264: the encryption unit 124 overwrites the encrypted data ED1 in the non-volatile memory 110 with the encrypted data ED2, go to step S250;

S270: the decryption unit 125 decrypts the encrypted data ED2 with the local key LK1;

S280: if the plain data PD1 is successfully obtained after the decryption using the local key LK1, then go to step S282, else go to step S290;

S282: the functional unit 126 performs operations according to the plain data PD1; and S290: terminate the process.

In step S210, the plain data PD1 can be encrypted with the global key GK1 to generate the encrypted data ED1, so in step S220, when the factory is requested to store the data to the non-volatile memory 110, the factory will only receive the encrypted data ED1 instead of the plain data PD1, thereby improving the information safety of the firmware downloading process.

Also, to decrypt the encrypted data ED1 correctly, the global key GK1 can be stored to the non-volatile memory 120 in step S230. In some embodiments, the application circuit 120 and the non-volatile memory 110 can be disposed in two different chips and may be manufactured by different factories. Therefore, steps S220 and S230 may be performed in different factories before the chips are integrated as the electronic device 100. In this case, the factory which is responsible to store the encrypted data ED1 to the non-volatile memory 110 will not receive the global key GK1 while the factory which is responsible to store the global key GK1 to the non-volatile memory 121 will not receive the encrypted data ED1. Therefore, the plain data PD1 can be protected from being hacked.

In some embodiments, before the electronic device 100 is shipped to the user, the encrypted data ED1 corresponding to the global key GK1 can be replaced by the encrypted data ED2 corresponding to the local key LK1. Therefore, when the user receives the electronic device 100, the encrypted data ED2 stored in the non-volatile memory 110 can only be encrypted with the local key LK1 uniquely generated for the electronic device 100, and thus, cannot be used and decrypted by other electronic devices without the local key LK1.

For example, after the non-volatile memory 110 and the application circuit 120 are packaged as the electronic device 100, the electronic device can be powered on in step S240 before shipping to the customer. In this case, the decryption unit 122 can retrieve the global key GK1 from the non-volatile memory 121 in step S250, and decrypts the encrypted data ED1 with the global key GK1 in step S252. In step S260, the decryption result will be examined to see if the plain data PD1 has been successfully obtained. In some embodiments, the plain data PD1 can be the firmware for setting up the application circuit 120, so the application circuit 120 should be able to identify the plain data PD1 if the decryption is successful.

If the plain data PD1 is successfully obtained, then in steps S262 and S264, the plain data PD1 will be encrypted with the local key LK1 to generate the encrypted data ED2, and the encrypted data ED1 will be replaced by the encrypted data ED2. After the encrypted data ED2 is stored to the non-volatile memory 110, the application circuit 120 may be restarted, and step S250 can be performed again. However, this time, in step S260, the decryption in step S252 may be failed, and the plain data PD1 cannot be obtained successfully. Therefore, after step S260, step S270 will be performed to decrypt the encrypted data ED2 with the local key LK1. In this case, if the encrypted data ED2 can be decrypted correctly to obtain the plain data PD1 with the local key LK1, steps S282 will be performed so the functional unit 126 can perform the operations accordingly. However, if the decryption fails, the process will be terminated. That is, if the local key LK1 does not match with the encrypted data ED2, the application circuit 120 would not be able to be initialized with the correct firmware, and thus, cannot function. Consequently, the illegitimate spreading of the firmware on unauthorized devices can be reduced.

In summary, the electronic device and the method for operating the electronic device can encrypt the confidential data with global keys and local keys in different stages; therefore, the confidential data can be protected from being hacked.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for operating an electronic device, the electronic device comprising a first non-volatile memory and an application circuit comprising a second non-volatile memory, a first decryption unit, an encryption unit, a second decryption unit, and a functional unit, the method comprising:

the first non-volatile memory storing a first encrypted data encrypted with a global key;

the second non-volatile memory storing the global key;

the first decryption unit retrieving the global key from the second non-volatile memory;

the first decryption unit decrypting the first encrypted data with the global key to generate plain data;

the encryption unit encrypting the plain data with a local key to generate second encrypted data;

the encryption unit overwriting the first encrypted data in the first non-volatile memory with the second encrypted data;

after the encryption unit overwrites the first encrypted data in the first non-volatile memory with the second encrypted data, restarting the application circuit, and the first decryption unit retrieving the global key from the second non-volatile memory, and performing a decryption with the global key;

in response to failure of the decryption, the second decryption unit decrypting the second encrypted data with the local key to obtain the plain data;

in response to correctly decrypting the second encrypted data with the local key, the functional unit performing operations according to the plain data; and in response to failure of the decryption and failure of decrypting the second encrypted data with the local key, terminating the application circuit.

2. The method of claim 1, wherein the plain data comprises firmware for setting the functional unit.

3. The method of claim 1, wherein the encryption unit encrypting the plain data with the local key to generate the second encrypted data comprises the encryption unit encrypting the plain data to generate the second encrypted data according to an authenticated encryption with associated data (AEAD) algorithm.

4. The method of claim 1, wherein the first non-volatile memory comprises a flash memory and/or a secure digital memory card (SD card).

5. The method of claim 1, wherein the second non-volatile memory comprises a one-time programmable (OTP) non-volatile memory.

6. The method of claim 1, wherein:
the application circuit and the first non-volatile memory are disposed in two different chips.

7. The method of claim 1, wherein:
the second non-volatile memory storing the global key is performed before or during a packaging process of the application circuit.

8. The method of claim 1, wherein the application circuit further comprises a local key unit, the local key unit comprises a physically unclonable function (PUF) unit, and the method comprising the local key unit generating the local key.

* * * * *